UNITED STATES PATENT OFFICE.

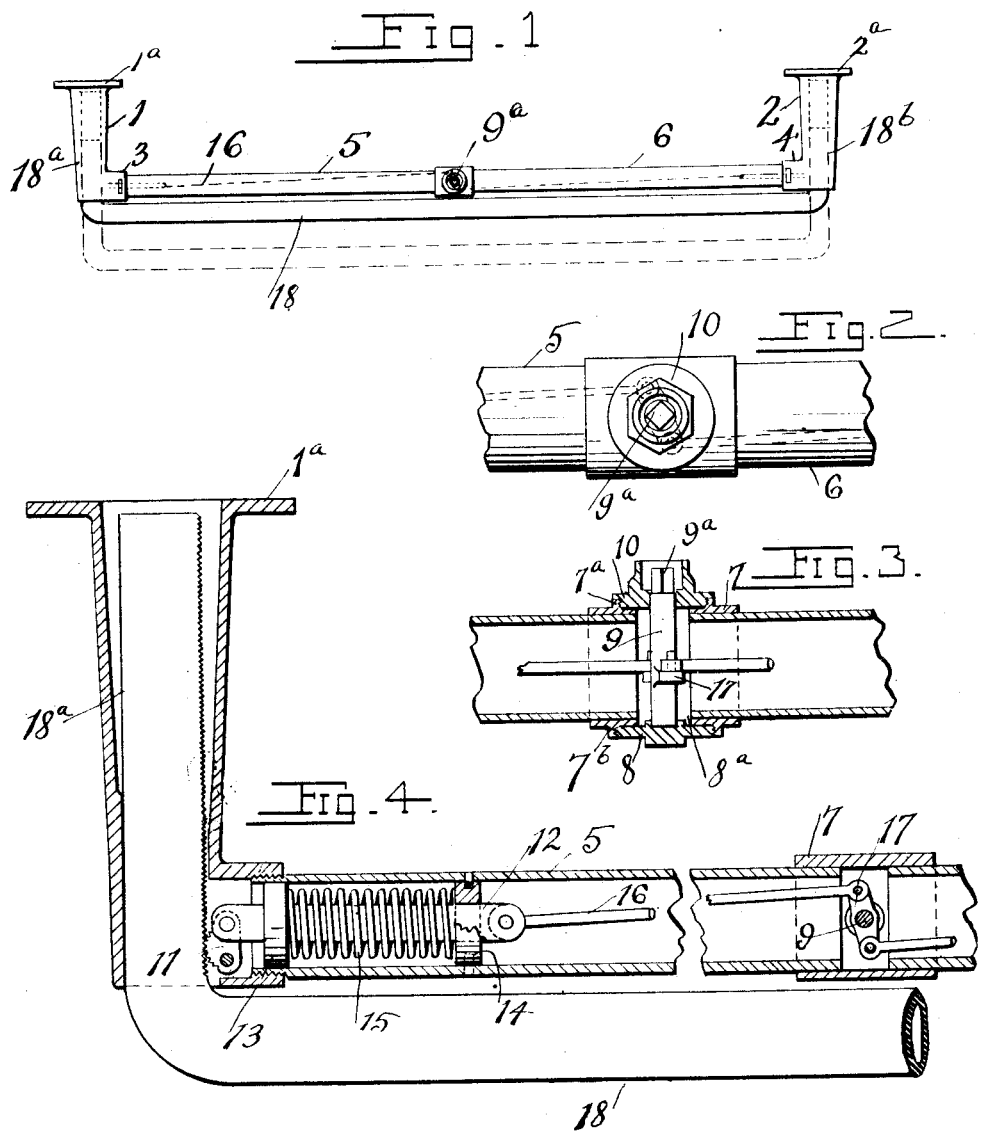

HERMAN W. OSTER, OF CLEVELAND, OHIO.

SUPPORT FOR ROBES.

1,059,065.

Specification of Letters Patent.

Patented Apr. 15, 1913.

Application filed May 11, 1912. Serial No. 696,545.

*To all whom it may concern:*

Be it known that I, HERMAN W. OSTER, a citizen of the United States, residing at Cleveland, in the county of Cuyahoga and State of Ohio, have invented a certain new and useful Improvement in Supports for Robes, of which the following is a full, clear, and exact description.

This invention relates to a supporting device for such articles as robes or blankets, and is more particularly designed for use as a fixture of a vehicle,—as an automobile,—to replace the usual robe support carried upon the back of the front seat.

The object of the invention is to provide a robe support which may be locked to hold the robes against removal until the locking means is released.

Generally speaking, the invention comprises the elements and combinations thereof set forth in the accompanying claims.

Reference should be had to the accompanying drawings in which—

Figure 1 is a top plan view; Fig. 2 is a top plan view of a portion of the support; Fig. 3 is a top plan view with parts in section of the showing in Fig. 2; and Fig. 4 is a top plan view of a portion of the device with certain parts in section.

Hollow standards 1 and 2 are provided with base portions 1ª and 2ª respectively, by which they may be secured upon that which is to form the support for the whole device, as for instance, the back of the front seat of an automobile. At the ends remote from the base, the standards have a flanged opening, at right angles to the axis of the standards, the flanges being represented at 3 and 4. These flanges are secured to tubular members 5 and 6 which at their adjacent ends are spaced apart and are secured to a sleeve 7. This sleeve is provided with alined openings oppositely disposed in the wall thereof, and surrounding these openings are interiorly threaded flanges 7ª and 7ᵇ. Coöperating with the flange 7ᵇ is a plate 8 which is peripherally threaded. The central part of the plate has a cupped projection 8ª forming a seat for one end of the shaft 9. The plate 10, which is peripherally threaded, coöperates with the flange 7ª. The central inner part of the plate has an opening therethrough which is provided with a shoulder. The shaft 9 has a head 9ª of smaller dimensions than the diameter of the shaft, thereby providing the shaft with a shoulder which engages the shoulder carried by the plate 10. In the manner thus described, the plates 8 and 10 provide a bearing for the opposite ends of the shaft 9. The head of the shaft 9 is squared or otherwise formed in a manner to engage with a suitable key or tool, by which the shaft may be turned, as will later be described.

Referring to Fig. 4, there is shown a link 11, a marginal portion of which is rounded and provided with teeth. A link mechanism connects this link 11 with the shaft 9 and this mechanism includes a member 12 provided with a head 13 which is of a diameter such as to have a sliding fit within the tube 5. The member 12 extends through an opening in a plug 14 which is secured within the tube 5 in any suitable manner. A spring 15 bears at opposite ends upon the plug 14 and head 13, and normally urges these members apart, and by so much, the link 11 to turn upon its pivot in an outward direction. The member 12 is pivotally connected with a rod 16 which in turn is pivotally secured to one arm of a member 17 which is secured upon the shaft 9. A rod or bar 18, which may be tubular, extends between the standards 1 and 2. This rod is provided with arms 18ª and 18ᵇ which extend into the hollow standards. As will be seen from Fig. 4, the standards taper and the inside diameters of the outer portions are of a size to closely fit a portion of the arms of bar 18, which extends with them. The arm 18ª is provided with teeth upon that part thereof which is adjacent the link 11, and as before described, the spring 15 normally urges the link 11 to turn upon its pivot in an outward direction which is toward the arm 18ª, and therefore the teeth upon the link and arm will normally remain in engagement.

The mechanism shown in Fig. 4 is duplicated upon the other side of the shaft 9, and it will therefore be unnecessary to describe this construction again.

It will be clear that the bar 18 may freely be pushed in a direction toward the standards, for upon such a movement of the bar, the toothed links are pushed upon their pivots, away from the arms of the bar 18. However, an attempt to pull the bar 18 in the opposite direction tends to rotate the toothed links toward the arms of the bar and thus the toothed links exert a wedging action which causes the locking of the arms against such movement. To accomplish the outward movement of the bar 18, it is necessary to insert a proper instrument to cooperate with the head 9ª, and turn the shaft 9 in a proper direction to rock the toothed links away from the bar 18.

The method of using the device is to turn the shaft 9 and pull the bar 18 outwardly a sufficient distance, then place the blankets or robes over the bar 18 and push the bar as far inwardly as is possible. This action will result in the robes or blankets being firmly held between the bar 18 and the tubular members 5 and 6, so that it will be quite impossible to remove them until the shaft 9 is operated to unlock the bar 18.

Having thus described my invention, what I claim is:

1. A robe support comprising hollow standards adapted to be fixed to a support, a rod having arms which extend within said hollow standards, said arms being provided with teeth, pivoted links having marginal teeth which normally engage the teeth on the arms, said links being pushed away to permit the bar to be moved toward the standards, but engaging the bar with a wedging action when the bar is moved away from the standards, and means for moving the said links to release the bar.

2. A robe support comprising hollow standards adapted to be fixed to a support, flange openings in said standards, a hollow body connected with the flanges of the opposite openings, a rod for supporting a robe, said rod having arms extending within the said hollow standards, said arms being provided with teeth, links pivoted upon the flanged openings of the standards, said links having marginal portions provided with teeth, which teeth are adapted to engage teeth upon the arms of the rod extending within the standard, a stub shaft mounted in the said hollow body, links operatively connected with the stub shaft and the toothed links, whereby the toothed links may be moved upon their pivots, and springs normally urging the toothed parts into engagement.

In testimony whereof I hereunto affix my signature in the presence of two witnesses.

HERMAN W. OSTER.

Witnesses:
 E. L. Thurston,
 A. J. Hudson.